(12) United States Patent
Fujitani et al.

(10) Patent No.: US 12,101,449 B2
(45) Date of Patent: Sep. 24, 2024

(54) IMAGE FORMING APPARATUS, IMAGE FORMING SYSTEM, AND IMAGE FORMING METHOD FOR DETERMINING A FILE NAME FOR SCANNED IMAGE DATA

(71) Applicant: SHARP KABUSHIKI KAISHA, Sakai (JP)

(72) Inventors: Masaya Fujitani, Sakai (JP); Takashi Usui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/223,569

(22) Filed: Jul. 19, 2023

(65) Prior Publication Data

US 2024/0031500 A1  Jan. 25, 2024

(30) Foreign Application Priority Data

Jul. 22, 2022 (JP) .............................. 2022-116800

(51) Int. Cl.
*H04N 1/00* (2006.01)
*G06F 16/16* (2019.01)
*G06V 30/18* (2022.01)
*G06V 30/40* (2022.01)

(52) U.S. Cl.
CPC ....... *H04N 1/00824* (2013.01); *G06F 16/164* (2019.01); *G06V 30/18* (2022.01); *G06V 30/40* (2022.01)

(58) Field of Classification Search
None
See application file for complete search history.

(56) References Cited

U.S. PATENT DOCUMENTS

| | | | |
|---|---|---|---|
| 2018/0218206 A1* | 8/2018 | Kamata | G06F 40/10 |
| 2018/0218208 A1* | 8/2018 | Arakawa | G06V 10/7788 |
| 2019/0197124 A1* | 6/2019 | Kaneko | G06F 16/164 |
| 2019/0197303 A1* | 6/2019 | Kanada | H04N 1/00413 |
| 2019/0197337 A1* | 6/2019 | Kanada | G06F 40/10 |
| 2020/0065294 A1* | 2/2020 | Takahashi | G06F 16/166 |

FOREIGN PATENT DOCUMENTS

| | | |
|---|---|---|
| JP | 2009-205325 A | 9/2009 |
| JP | 2021-114224 A | 8/2021 |

* cited by examiner

*Primary Examiner* — Dung D Tran
(74) *Attorney, Agent, or Firm* — ScienBiziP, P.C.

(57) ABSTRACT

An image forming apparatus includes: a reader that reads a document and generates first document data; a first extractor that extracts first character information included in the first document data; a second extractor that searches a storage device storing a plurality of pieces of document data and extracts one or more pieces of second document data including second character information related to the first character information; and an estimator that estimates a file name to be set for the first document data from the first character information, on basis of a naming rule for a file name of the second document data based on a relation between the second character information and the file name of the second document data.

13 Claims, 12 Drawing Sheets

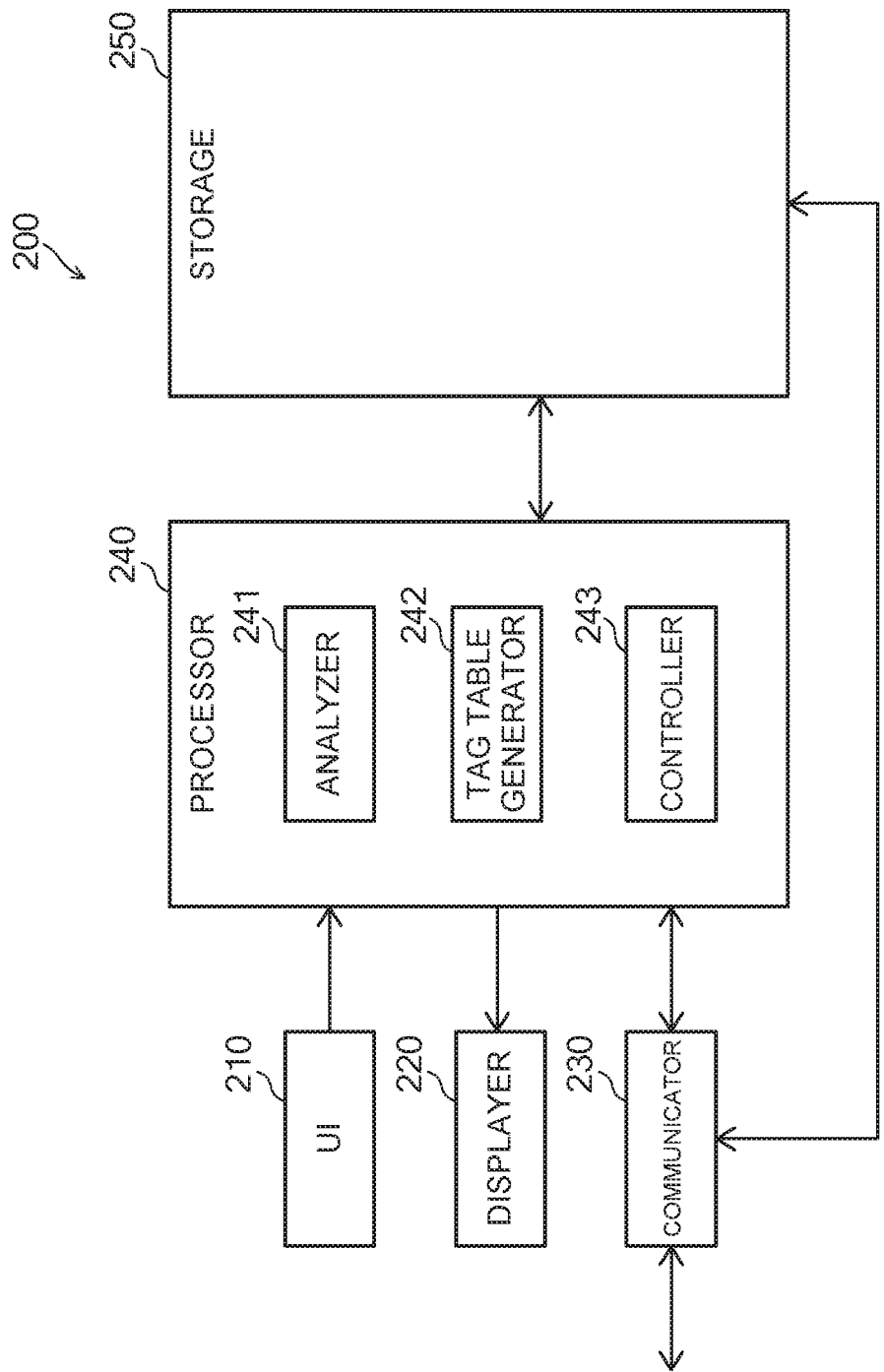

FIG. 6

| TAG | FOLDER HIERARCHY | FILE NAME | START COORDINATES X | START COORDINATES Y | END COORDINATES X | END COORDINATES Y |
|---|---|---|---|---|---|---|
| DAILY BUSINESS REPORT | EMPLOYEE MGMT.>DAILY BUSINESS REPORT>SALES DEPT.>AYAMA BTARO | DAILY BUSINESS REPORT_AYAMA BTARO_20210828.pdf | 224 | 432 | 1920 | 688 |
| AYAMA BTARO | EMPLOYEE MGMT.>DAILY BUSINESS REPORT>SALES DEPT.>AYAMA BTARO | DAILY BUSINESS REPORT_AYAMA BTARO_20210828.pdf | 3088 | 944 | 4528 | 1296 |
| AUGUST 28, 2021 | EMPLOYEE MGMT.>DAILY BUSINESS REPORT>SALES DEPT.>AYAMA BTARO | DAILY BUSINESS REPORT_AYAMA BTARO_20210828.pdf | 3184 | 616 | 4752 | 840 |
| DAILY BUSINESS REPORT | EMPLOYEE MGMT.>DAILY BUSINESS REPORT>SALES DEPT.>AYAMA BTARO | DAILY BUSINESS REPORT_AYAMA BTARO_20210829.pdf | 224 | 432 | 1920 | 688 |
| AYAMA BTARO | EMPLOYEE MGMT.>DAILY BUSINESS REPORT>SALES DEPT.>AYAMA BTARO | DAILY BUSINESS REPORT_AYAMA BTARO_20210829.pdf | 3084 | 940 | 4532 | 1298 |
| AUGUST 29, 2021 | EMPLOYEE MGMT.>DAILY BUSINESS REPORT>SALES DEPT.>AYAMA BTARO | DAILY BUSINESS REPORT_AYAMA BTARO_20210829.pdf | 3185 | 611 | 4756 | 841 |
| DAILY BUSINESS REPORT | EMPLOYEE MGMT.>DAILY BUSINESS REPORT>SALES DEPT.>AYAMA BTARO | DAILY BUSINESS REPORT_AYAMA BTARO_20210830.pdf | 224 | 432 | 1920 | 688 |
| AYAMA BTARO | EMPLOYEE MGMT.>DAILY BUSINESS REPORT>SALES DEPT.>AYAMA BTARO | DAILY BUSINESS REPORT_AYAMA BTARO_20210830.pdf | 3090 | 940 | 4526 | 1294 |
| AUGUST 30, 2021 | EMPLOYEE MGMT.>DAILY BUSINESS REPORT>SALES DEPT.>AYAMA BTARO | DAILY BUSINESS REPORT_AYAMA BTARO_20210830.pdf | 3180 | 613 | 4750 | 841 |
| DAILY BUSINESS REPORT | EMPLOYEE MGMT.>DAILY BUSINESS REPORT>SALES DEPT.>CMOTO DMI | DAILY BUSINESS REPORT_CMOTO DMI_20210828.pdf | 224 | 432 | 1920 | 688 |
| CMOTO DMI | EMPLOYEE MGMT.>DAILY BUSINESS REPORT>SALES DEPT.>CMOTO DMI | DAILY BUSINESS REPORT_CMOTO DMI_20210828.pdf | 3089 | 945 | 4523 | 1295 |
| AUGUST 28, 2021 | EMPLOYEE MGMT.>DAILY BUSINESS REPORT>SALES DEPT.>CMOTO DMI | DAILY BUSINESS REPORT_CMOTO DMI_20210828.pdf | 3182 | 620 | 4751 | 836 |
| DAILY BUSINESS REPORT | EMPLOYEE MGMT.>DAILY BUSINESS REPORT>SALES DEPT.>ETANI FSUKE | DAILY BUSINESS REPORT_ETANI FSUKE_20210828.pdf | 224 | 432 | 1920 | 688 |
| ETANI FSUKE | EMPLOYEE MGMT.>DAILY BUSINESS REPORT>SALES DEPT.>ETANI FSUKE | DAILY BUSINESS REPORT_ETANI FSUKE_20210828.pdf | 3087 | 945 | 4524 | 1297 |
| AUGUST 28, 2021 | EMPLOYEE MGMT.>DAILY BUSINESS REPORT>SALES DEPT.>ETANI FSUKE | DAILY BUSINESS REPORT_ETANI FSUKE_20210828.pdf | 3187 | 614 | 4757 | 836 |
| PERFORMANCE DECLARATION | EMPLOYEE MGMT.>PERFORMANCE DECLARATION>FIRST HALF OF 2021>SALES DEPT. | PERFORMANCE DECLARATION_AYAMA BTARO_FIRST HALF OF 2021.pdf | 728 | 472 | 3080 | 864 |
| AYAMA BTARO | EMPLOYEE MGMT.>PERFORMANCE DECLARATION>FIRST HALF OF 2021>SALES DEPT. | PERFORMANCE DECLARATION_AYAMA BTARO_FIRST HALF OF 2021.pdf | 4211 | 577 | 5526 | 893 |
| FIRST HALF OF 2021 | EMPLOYEE MGMT.>PERFORMANCE DECLARATION>FIRST HALF OF 2021>SALES DEPT. | PERFORMANCE DECLARATION_AYAMA BTARO_FIRST HALF OF 2021.pdf | 5264 | 264 | 6424 | 592 |
| PERFORMANCE DECLARATION | EMPLOYEE MGMT.>PERFORMANCE DECLARATION>FIRST HALF OF 2021>SALES DEPT. | PERFORMANCE DECLARATION_CMOTO DMI_FIRST HALF OF 2021.pdf | 728 | 472 | 3080 | 864 |
| CMOTO DMI | EMPLOYEE MGMT.>PERFORMANCE DECLARATION>FIRST HALF OF 2021>SALES DEPT. | PERFORMANCE DECLARATION_CMOTO DMI_FIRST HALF OF 2021.pdf | 4210 | 573 | 5527 | 884 |
| FIRST HALF OF 2021 | EMPLOYEE MGMT.>PERFORMANCE DECLARATION>FIRST HALF OF 2021>SALES DEPT. | PERFORMANCE DECLARATION_CMOTO DMI_FIRST HALF OF 2021.pdf | 5264 | 264 | 6424 | 592 |
| PERFORMANCE DECLARATION | EMPLOYEE MGMT.>PERFORMANCE DECLARATION>FIRST HALF OF 2021>SALES DEPT. | PERFORMANCE DECLARATION_ETANI FSUKE_FIRST HALF OF 2021.pdf | 728 | 472 | 3080 | 864 |
| ETANI FSUKE | EMPLOYEE MGMT.>PERFORMANCE DECLARATION>FIRST HALF OF 2021>SALES DEPT. | PERFORMANCE DECLARATION_ETANI FSUKE_FIRST HALF OF 2021.pdf | 4213 | 574 | 5528 | 893 |
| FIRST HALF OF 2021 | EMPLOYEE MGMT.>PERFORMANCE DECLARATION>FIRST HALF OF 2021>SALES DEPT. | PERFORMANCE DECLARATION_ETANI FSUKE_FIRST HALF OF 2021.pdf | 5264 | 264 | 6424 | 592 |
| BUSINESS TRIP REPORT | EMPLOYEE MGMT.>BUSINESS TRIP REPORT>SALES DEPT.>AYAMA BTARO | BUSINESS TRIP REPORT_AYAMA BTARO_20210827_PATENT OFFICE.pdf | 1448 | 686 | 4264 | 1056 |
| AYAMA BTARO | EMPLOYEE MGMT.>BUSINESS TRIP REPORT>SALES DEPT.>AYAMA BTARO | BUSINESS TRIP REPORT_AYAMA BTARO_20210827_PATENT OFFICE.pdf | 3328 | 1320 | 4680 | 1736 |
| AUGUST 27, 2021 | EMPLOYEE MGMT.>BUSINESS TRIP REPORT>SALES DEPT.>AYAMA BTARO | BUSINESS TRIP REPORT_AYAMA BTARO_20210827_PATENT OFFICE.pdf | 3592 | 128 | 4760 | 464 |
| PATENT OFFICE | EMPLOYEE MGMT.>BUSINESS TRIP REPORT>SALES DEPT.>AYAMA BTARO | BUSINESS TRIP REPORT_AYAMA BTARO_20210827_PATENT OFFICE.pdf | 3688 | 1896 | 4496 | 2056 |
| BUSINESS TRIP REPORT | EMPLOYEE MGMT.>BUSINESS TRIP REPORT>SALES DEPT.>ETANI FSUKE | BUSINESS TRIP REPORT_ETANI FSUKE_20210831_TOKYO PATENT OFFICE.pdf | 1448 | 686 | 4264 | 1056 |
| ETANI FSUKE | EMPLOYEE MGMT.>BUSINESS TRIP REPORT>SALES DEPT.>ETANI FSUKE | BUSINESS TRIP REPORT_ETANI FSUKE_20210831_TOKYO PATENT OFFICE.pdf | 3323 | 1322 | 4681 | 1741 |
| AUGUST 31, 2021 | EMPLOYEE MGMT.>BUSINESS TRIP REPORT>SALES DEPT.>ETANI FSUKE | BUSINESS TRIP REPORT_ETANI FSUKE_20210831_TOKYO PATENT OFFICE.pdf | 3594 | 128 | 4765 | 466 |
| TOKYO PATENT OFFICE | EMPLOYEE MGMT.>BUSINESS TRIP REPORT>SALES DEPT.>ETANI FSUKE | BUSINESS TRIP REPORT_ETANI FSUKE_20210831_TOKYO PATENT OFFICE.pdf | 3688 | 1895 | 4491 | 2055 |

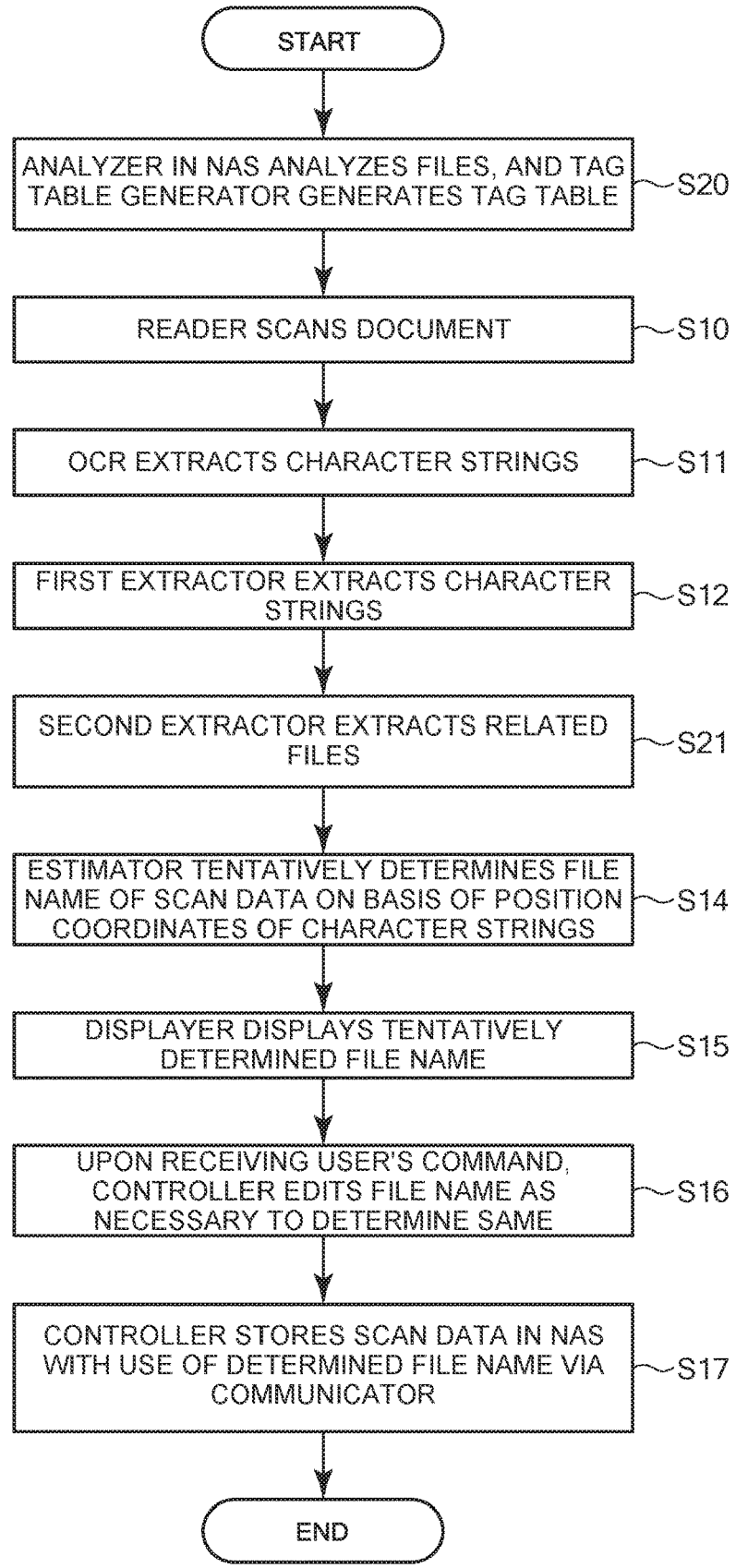

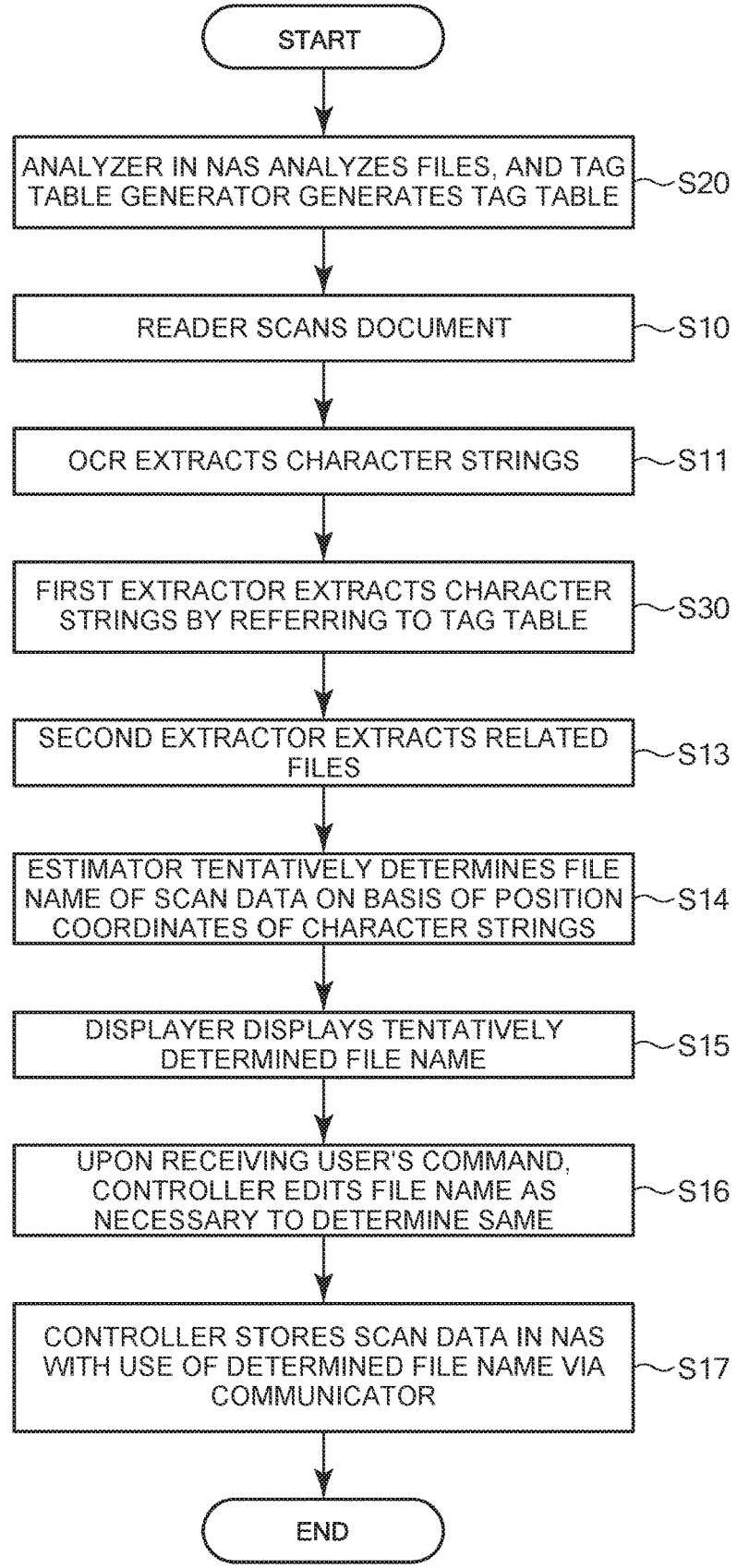

FIG. 9A

| CLASSIFIED PATTERNS | FOLDER HIERARCHY | FILE NAME | TAG LIST | | | |
|---|---|---|---|---|---|---|
| PATTERN A | EMPLOYEE MGMT>DAILY BUSINESS REPORT>SALES DEPT>AYAMA BTARO | DAILY BUSINESS REPORT_AYAMA BTARO_20210828.pdf | DAILY BUSINESS REPORT | AYAMA BTARO | AUGUST 28, 2021 | |
| PATTERN A | EMPLOYEE MGMT>DAILY BUSINESS REPORT>SALES DEPT>AYAMA BTARO | DAILY BUSINESS REPORT_AYAMA BTARO_20210829.pdf | DAILY BUSINESS REPORT | AYAMA BTARO | AUGUST 29, 2021 | |
| PATTERN A | EMPLOYEE MGMT>DAILY BUSINESS REPORT>SALES DEPT>AYAMA BTARO | DAILY BUSINESS REPORT_AYAMA BTARO_20210830.pdf | DAILY BUSINESS REPORT | AYAMA BTARO | AUGUST 30, 2021 | |
| PATTERN A | EMPLOYEE MGMT>DAILY BUSINESS REPORT>SALES DEPT>CMOTO DMI | DAILY BUSINESS REPORT_CMOTO DMI_20210828.pdf | DAILY BUSINESS REPORT | CMOTO DMI | AUGUST 28, 2021 | |
| PATTERN A | EMPLOYEE MGMT>DAILY BUSINESS REPORT>SALES DEPT>ETANI FSUKE | DAILY BUSINESS REPORT_ETANI FSUKE_20210828.pdf | DAILY BUSINESS REPORT | ETANI FSUKE | AUGUST 28, 2021 | |
| PATTERN B | EMPLOYEE MGMT>PERFORMANCE DECLARATION>FIRST HALF OF 2021>SALES DEPT. | PERFORMANCE DECLARATION_AYAMA BTARO_FIRST HALF OF 2021.pdf | PERFORMANCE DECLARATION | AYAMA BTARO | FIRST HALF OF 2021 | |
| PATTERN B | EMPLOYEE MGMT>PERFORMANCE DECLARATION>FIRST HALF OF 2021>SALES DEPT. | PERFORMANCE DECLARATION_CMOTO DMI_FIRST HALF OF 2021.pdf | PERFORMANCE DECLARATION | CMOTO DMI | FIRST HALF OF 2021 | |
| PATTERN B | EMPLOYEE MGMT>PERFORMANCE DECLARATION>FIRST HALF OF 2021>SALES DEPT. | PERFORMANCE DECLARATION_ETANI FSUKE_FIRST HALF OF 2021.pdf | PERFORMANCE DECLARATION | ETANI FSUKE | FIRST HALF OF 2021 | |
| PATTERN C | EMPLOYEE MGMT>BUSINESS TRIP REPORT>SALES DEPT>AYAMA BTARO | BUSINESS TRIP REPORT_AYAMA BTARO_20210827_PATENT OFFICE.pdf | BUSINESS TRIP REPORT | AYAMA BTARO | AUGUST 27, 2021 | PATENT OFFICE |
| PATTERN C | EMPLOYEE MGMT>BUSINESS TRIP REPORT>SALES DEPT>ETANI FSUKE | BUSINESS TRIP REPORT_ETANI FSUKE_20210831_TOKYO PATENT OFFICE.pdf | BUSINESS TRIP REPORT | ETANI FSUKE | AUGUST 31, 2021 | TOKYO PATENT OFFICE |

FIG. 9B

| TAG LIST | DATE JUDGE | A | B | C |
|---|---|---|---|---|
| DAILY BUSINESS REPORT | NO | 100% | 0% | 0% |
| AYAMA BTARO | NO | 60% | 33% | 50% |
| AUGUST 28, 2021 | YES | 60% | 0% | 0% |
| AUGUST 29, 2021 | YES | 20% | 0% | 0% |
| AUGUST 30, 2021 | YES | 20% | 0% | 0% |
| CMOTO DMI | NO | 20% | 33% | 0% |
| ETANI FSUKE | NO | 20% | 33% | 50% |
| PERFORMANCE DECLARATION | NO | 0% | 100% | 0% |
| FIRST HALF OF 2021 | YES | 0% | 100% | 0% |
| BUSINESS TRIP REPORT | NO | 0% | 0% | 100% |
| AUGUST 27, 2021 | YES | 0% | 0% | 50% |
| PATENT OFFICE | NO | 0% | 0% | 50% |
| AUGUST 31, 2021 | YES | 0% | 0% | 50% |
| TOKYO PATENT OFFICE | NO | 0% | 0% | 50% |

FIG. 9C

| PATTERN | FILE NAME | UNIQUE CHARACTER STRING |
|---|---|---|
| PATTERN A | DAILY BUSINESS REPORT_AYAMA BTARO_20210828.pdf | DAILY BUSINESS REPORT |
| PATTERN A | DAILY BUSINESS REPORT_AYAMA BTARO_20210829.pdf | DAILY BUSINESS REPORT |
| PATTERN A | DAILY BUSINESS REPORT_AYAMA BTARO_20210830.pdf | DAILY BUSINESS REPORT |
| PATTERN A | DAILY BUSINESS REPORT_CMOTO DMI_20210828.pdf | DAILY BUSINESS REPORT |
| PATTERN A | DAILY BUSINESS REPORT_ETANI FSUKE_20210828.pdf | DAILY BUSINESS REPORT |
| PATTERN B | PERFORMANCE DECLARATION_AYAMA BTARO_FIRST HALF OF 2021.pdf | PERFORMANCE DECLARATION |
| PATTERN B | PERFORMANCE DECLARATION_CMOTO DMI_FIRST HALF OF 2021.pdf | PERFORMANCE DECLARATION |
| PATTERN B | PERFORMANCE DECLARATION_ETANI FSUKE_FIRST HALF OF 2021.pdf | PERFORMANCE DECLARATION |
| PATTERN C | BUSINESS TRIP REPORT_AYAMA BTARO_20210827_PATENT OFFICE.pdf | BUSINESS TRIP REPORT |
| PATTERN C | BUSINESS TRIP REPORT_ETANI FSUKE_20210831_TOKYO PATENT OFFICE.pdf | BUSINESS TRIP REPORT |

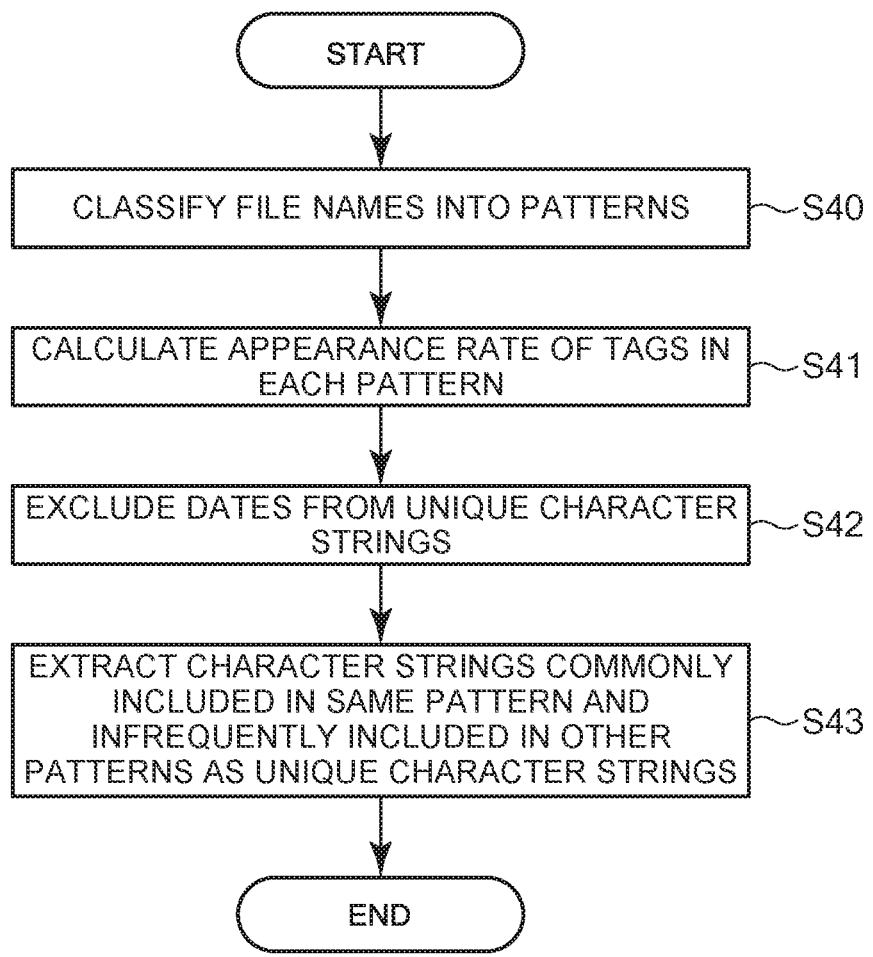

IMAGE FORMING APPARATUS, IMAGE FORMING SYSTEM, AND IMAGE FORMING METHOD FOR DETERMINING A FILE NAME FOR SCANNED IMAGE DATA

CROSS-REFERENCE TO RELATED APPLICATION

The present application claims priority from Japanese Application JP2022-116800, the content to which is hereby incorporated by reference into this application.

BACKGROUND OF THE INVENTION

1. Field of the Invention

The present disclosure relates to an image forming apparatus, an image forming system, and an image forming method.

2. Description of the Related Art

There is a known technique to store papers scanned by a multifunction peripheral in a network attached storage (NAS). In conventional techniques, a technique is known in which an image is stored in a cloud storage server and a file related to the image is searched in the NAS.

Moreover, in conventional techniques, a technique is known in which multiple templates and a naming rule table that defines a naming rule for each template are prepared, and the file name of scanned data is determined in accordance with this naming rule.

SUMMARY OF THE INVENTION

As mentioned above, the function to save scanned images directly in the NAS is known, but it is difficult to locate a desired image file for later viewing. In this regard, the method disclosed in conventional techniques is a technique for searching for image files related to an image file on the basis of the image file, and the original image data for searching is required. Further, according to the method disclosed in conventional techniques, it is necessary to prepare a naming rule table in advance in order to determine a file name.

As one aspect, an object of the present disclosure is to provide an image forming apparatus, an image forming system, and an image forming method that can easily set the file name of scanned image data.

An image forming apparatus according to one aspect of the present disclosure incudes a reader that reads a document and generates first document data, a first extractor that extracts first character information included in the first document data, a second extractor that searches a storage device storing a plurality of pieces of document data and extracts one or more pieces of second document data including second character information related to the first character information, and an estimator that estimates a file name to be set for the first document data from the first character information, on basis of a naming rule for a file name of the second document data based on a relation between second character information and the file name of the second document data.

BRIEF DESCRIPTION OF THE DRAWINGS

FIG. 5 is a block diagram of a NAS according to a second embodiment.

FIG. 6 is a conceptual diagram of a tag table according to the second embodiment.

FIG. 7 is a flowchart illustrating an example of a flow of processing according to the second embodiment.

FIG. 8 is a flowchart illustrating an example of a flow of processing according to a third embodiment.

FIG. 9A is a conceptual diagram of a tag table according to a fourth embodiment.

FIG. 9B is a conceptual diagram of a method for extracting unique character strings according to the fourth embodiment.

FIG. 9C is a conceptual diagram of a unique character string table according to the fourth embodiment.

FIG. 10 is a flowchart of an example illustrating a flow of processing of a method for generating the unique character string table according to the fourth embodiment.

DETAILED DESCRIPTION OF THE INVENTION

First Embodiment

Figure 1:
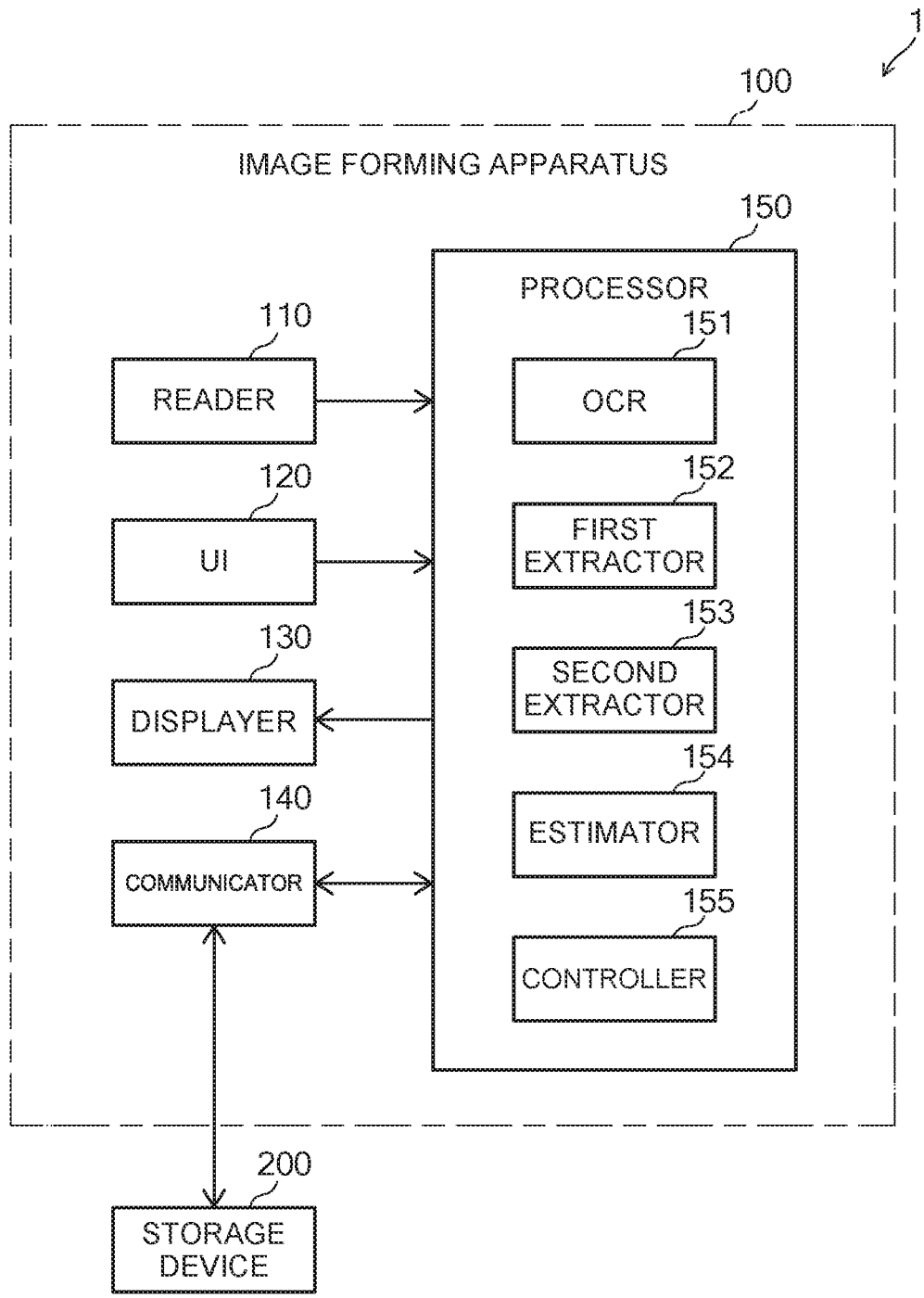
FIG. 1 is a block diagram of an image forming system according to a first embodiment.

A first embodiment will be described below. FIG. 1 is a block diagram illustrating an example of an image forming system of a first embodiment. As illustrated in FIG. 1, an image forming system 1 includes an image forming apparatus 100 and a NAS (storage device) 200. The image forming apparatus 100 is, for example, a copier, which scans papers such as documents to generate document data. The NAS 200 is, for example, a server, hard disk drive, or the like, and is provided outside the image forming apparatus 100 and can communicate with the image forming apparatus 100 through a network, such as the Internet. Further, the NAS 200 stores the document data generated by the image forming apparatus 100. The details of the image forming apparatus 100 will be described below.

As illustrated in FIG. 1, the image forming apparatus 100 includes a reader 110, a user interface 120, a displayer 130, a communicator 140, and a processor 150.

The reader 110 is, for example, a scanner. The reader 110 is equipped with, for example, a document table and an automatic document feeder, which optically scan papers provided by a user and generate scan data (first document data).

The user interface 120 accepts commands from the user for the image forming apparatus 100. For example, in a case where the image forming apparatus 100 is a copier, the user interface 120 accepts commands related to scan quality and scanning start commands when scanning papers, and commands related to the number of sheets to be copied and copying start commands when making copies. The user interface 120 also accepts an input from the user for the file name to be assigned to the first document data obtained by the reader 110.

The displayer 130 displays items that should be presented to the user in the image forming apparatus 100. In this embodiment, a candidate for file name that should be assigned to the scan data obtained by the reader 110 is displayed. The details of how this candidate file name is determined are described below. The displayer 130 may be a touch panel LCD screen, or the like. In this case, the displayer 130 may be integrated with the user interface 120.

The communicator 140 can communicate with the external storage device 200 wirelessly or by wire. Further, the communicator 140 transmits the scan data obtained by the reader 110 and the file name to be assigned to the scan data to the NAS 200. The NAS 200 then saves the scan data with the use of the file name.

The processor 150 is a processor, such as a central processing unit (CPU). The processor 150 functions as an optical character reader (OCR) 151, a first extractor 152, a second extractor 153, an estimator 154, and a controller 155 by executing a program stored in a read only memory (ROM) or random access memory (RAM) (not illustrated) in the image forming apparatus 100. The program is stored in a non-transitory recording medium, such as a semiconductor medium, an optical recording medium, or a magneto-optical recording medium, including, for example, the above-mentioned ROM and RAM. Further, when the program stored in the recording medium is executed by the processor 150, the processor 150 functions as the OCR 151, first extractor 152, second extractor 153, estimator 154, and controller 155 to implement various controls in each embodiment. Moreover, the program described above may also be acquired by the image forming apparatus 100 from an external server through a network. Note that the function of the OCR 151 may be included in the reader 110. Further, in this embodiment, the case where the functions in the processor 150 are implemented by a processor (software) is described as an example, but some or all of the functions in the processor 150 may be configured by hardware, such as electronic circuits, respectively.

The OCR 151 recognizes and extracts character strings contained in the scan data generated by the reader 110.

The first extractor 152 extracts a predetermined character string (first character information) contained in the scan data. In other words, the OCR 151 extracts all recognizable character strings from the character strings included in the scan data. In contrast, the first extractor 152 extracts only characteristic character strings from the character strings extracted by the OCR 151 with the use of, for example, a method such as text mining. However, the first extractor 152 does not necessarily need to use an advanced method such as text mining. For example, if a character string extracted by the OCR 151 is the sentence "I went on a business trip to Tokyo on Jun. 3, 2022", the first extractor 152 should be capable of extracting all character strings of "Jun. 3, 2022", "Tokyo", and "business trip", excluding particles and other characters in this sentence. The first extractor 152 then associates the extracted character strings as tags for the scan data.

The second extractor 153 searches the NAS 200, which stores a plurality of pieces of document data, and extracts one or more related files (second document data) that contain character strings (second character information) related to the first character information. In other words, the second extractor 153 analyzes a plurality of files stored in the NAS 200 and extracts, as a related file, a file that contains, in the image data, the same character string as the tags extracted by the first extractor 152. In doing so, the second extractor 153 may extract the second document data by analyzing an actual image in a file in the NAS 200, or on the basis of a file name, or both.

The estimator 154 estimates the file name to be set for the scan data, with the use of the first character information, on the basis of a naming rule for the file name of the related file based on the relation between the second character information and the file name of the related file. In other words, the estimator 154 analyzes the related file extracted by the second extractor 153 to grasp the relation between the file name of the related file and the position information in the image of the related file of the character string contained in the file name. Then, the estimator 154 estimates and tentatively determines the file name of the scan data on the basis of the relation between the position information and the file name. In other words, the estimator 154 estimates the naming rule for the file name per se in the related files on the basis of the images and file names of the related files. Then, by applying the naming rule obtained by the estimation to the scan data, the estimator 154 estimates and tentatively determines the file name of the scan data. This method is described below using a specific example.

The controller 155 controls the operation of the entire image forming apparatus 100. The controller 155, for example, commands the reader 110 to perform a reading operation in response to a scanning command from the user, or commands the communicator 140 to transmit the obtained scan data to the NAS 200.

Next, in the image forming system 1 configured as described above, a specific example will be given to explain a method for tentatively determining a file name when storing a file of scan data obtained by scanning a document in the NAS 200. In this embodiment, when scan data is generated, the first extractor 152, second extractor 153, and estimator 154 propose a file name suitable for the content of the scan data to the user without requiring a naming rule table for a file name or the like.

Figure 2:
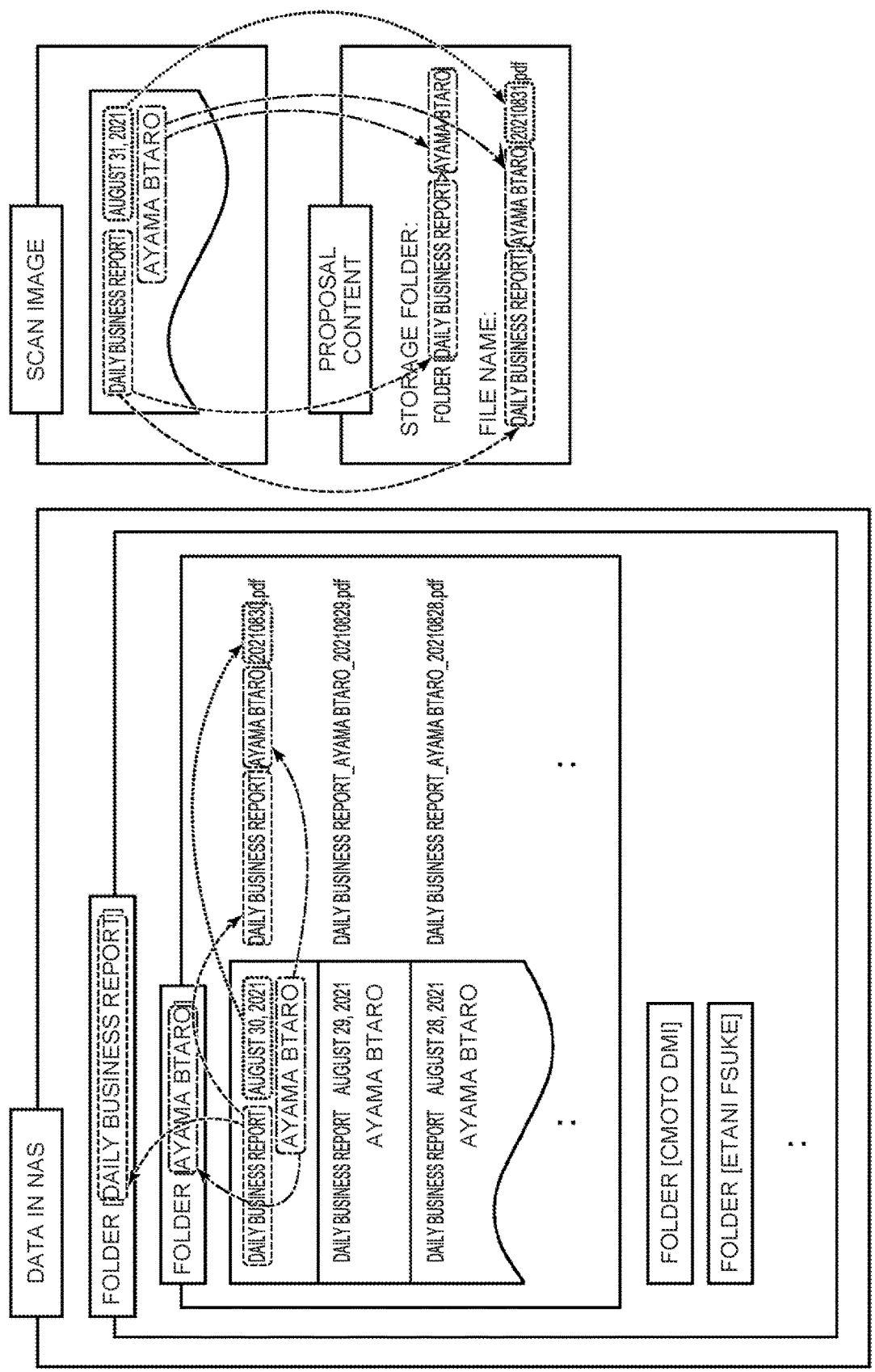
FIG. 2 is a conceptual diagram illustrating data in a NAS, scan data, and tentatively determined file names according to the first embodiment.

FIG. 2 is a conceptual diagram illustrating the files of document data stored in the NAS 200, the concept of the folder structure for storing these files, the concept of scanned data, and the file name proposed by the image forming apparatus 100.

First, the NAS 200 will be described. In this embodiment, the NAS 200 stores a plurality of pieces of document data related to business operations, for example. Each document data has its own file name. Further, each document data is stored in a folder with a predetermined hierarchical structure. In the example illustrated in FIG. 2, a folder "DAILY BUSINESS REPORT" is formed in the NAS 200, and within this folder "DAILY BUSINESS REPORT", for example, a folder "AYAMA BTARO", a folder "CMOTO DMI", and a folder "ETANI FSUKE" are formed. The folder names "AYAMA BTARO", "CMOTO DMI", and "ETANI FSUKE" are user names, and the daily business report files of these users are stored in the respective folders. As a matter of course, folder names and folder structure are not limited to that in FIG. 2. Among these folders, a case where the folder "AYAMA BTARO" and related scan data are obtained will be described below.

The folder "AYAMA BTARO" contains, for example, the following three daily business report files.

DAILY BUSINESS REPORT_AYAMA BTARO_20210830.pdf
DAILY BUSINESS REPORT_AYAMA BTARO_20210829.pdf
DAILY BUSINESS REPORT_AYAMA BTARO_20210828.pdf Next, scan data will be described. As illustrated in FIG. 2, the image of the scan data includes, as a character string, a daily business report, a date, a name, and sentences (not illustrated) related to the day's business operation. Therefore, the OCR 151 first extracts all recognizable character strings included in the scan data. Furthermore, the first extractor 152 extracts only the characteristic character strings (first character information) from the character strings obtained by the OCR 151 using the method described above, and associates them as tags for the scan data. The character strings to be extracted include, as mentioned above, character strings related to the substantive content in the scanned data, such as "date", "Tokyo", "business trip", and the like, as well as character strings described as the format of the daily business report, such as "daily business report", "name", and "date".

The second extractor 153 continues to search the NAS 200 and extract the related files on the basis of the first character information. In other words, the second extractor 153 analyzes the images in the files contained in each folder in the NAS 200 to search for files that contain character strings such as "date", "Tokyo", "business trip", "daily business report", and "name" extracted by the first extractor 152. As a result, the following three daily business report files in the folder "AYAMA BTARO" are extracted as related files.

Figure 3A:
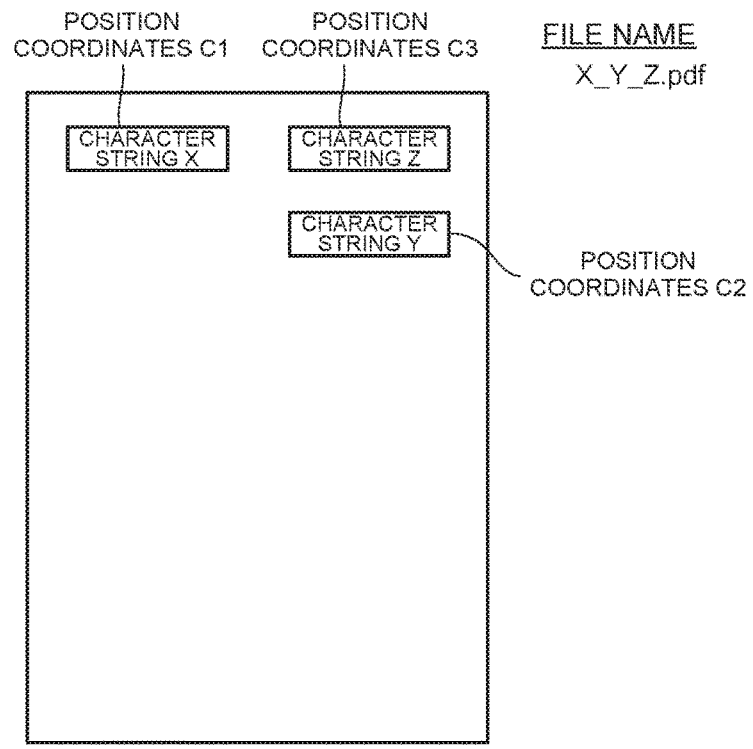
FIG. 3A is a schematic diagram of a related file according to the first embodiment.

DAILY BUSINESS REPORT_AYAMA BTARO_20210830.pdf
 DAILY BUSINESS REPORT_AYAMA BTARO_20210829.pdf
 DAILY BUSINESS REPORT_AYAMA BTARO_20210828.pdf As described above, the estimator 154 then estimates the file name to be set for the scan data from the first character information on the basis of the naming rule for the file name of the related file based on the relation between the second character information and the file name of the related file. The relation between this second character information and the related file and the naming rule will be described with the use of FIG. 3A. FIG. 3A is a schematic diagram of the image data of a certain related file.

Suppose that the file name of the certain related file is "X_Y_Z.pdf". The estimator 154 then identifies the position coordinates in the image of the character strings X, Y, and Z contained in the file name. The identification of the position coordinates may be performed by the second extractor 153. In the example in FIG. 3A, the character string X is described at position coordinates C1, the string Y is described at position coordinates C2, and the string Z is described at position coordinates C3. The position coordinates are indicated by, for example, XY coordinates in the image. This allows the estimator 154 to recognize that the character strings described at these position coordinates C1, C2, and C3 are associated with file names. The estimator 154 then analyzes the relation between the character strings described at these position coordinates C1, C2, and C3 and the file names. In the example in FIG. 3A, the file name is "X_Y_Z.pdf", so it is recognized that the character strings are arranged in the order of the character string at position coordinates C1, the character string at position coordinates C2, and the character string at position coordinates C3 in the image, and that "_" is inserted between the character strings, and recognized that this is the naming rule for the file name. Consequently, according to this naming rule, the estimator 154 estimates and tentatively determines the file name of the scan data.

Figure 3B:
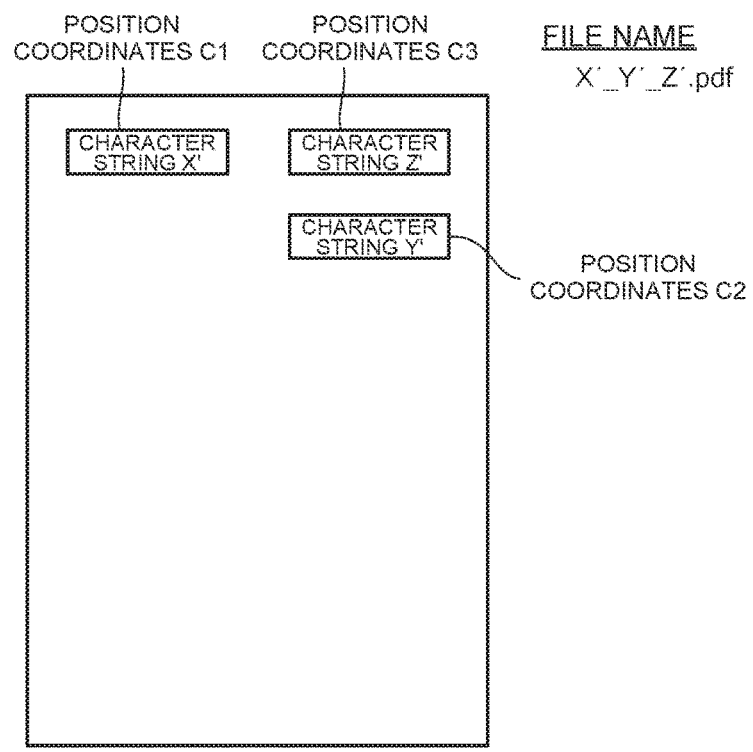
FIG. 3B is a schematic diagram of scan data according to the first embodiment.

FIG. 3B is a schematic diagram of the image data of the scan data, where the file illustrated in FIG. 3A is recognized as the related file. As illustrated in FIG. 3B, in the scan data, the character string X' is described at position coordinates C1, the character string Y' is described at position coordinates C2, and the character string Z' is described at position coordinates C3. Therefore, the estimator 154 estimates that these character strings X', Y', and Z' are used as the file name of the scan data. The file name of the scan data is then tentatively determined in accordance with the naming rule based on the position coordinates, that is, the naming rule in the order of the character strings described at the position coordinates C1, C2, and C3, and inserting "_" between the character strings. In other words, in this case, the file name "X'_Y'_Z'.pdf" is tentatively determined.

In the example in FIG. 2, the related file name is "DAILY BUSINESS REPORT_AYAMA BTARO_DATE.pdf". Further, in the scan data, the character strings described at the same coordinates as the coordinates in the related file where "DAILY BUSINESS REPORT", "AYAMA BTARO", and "DATE" are described are "DAILY BUSINESS REPORT", "AYAMA BTARO" and "Aug. 31, 2021". Therefore, the file name of the scan data in FIG. 2 is tentatively determined to be "DAILY BUSINESS REPORT_AYAMA BTARO_20210831.pdf".

After that, the controller 155, for example, displays the file name tentatively determined by the estimator 154, for example, on the displayer 130. The user interface 120 then accepts commands from the user. In other words, if the user thinks that the tentatively determined file name is acceptable, the user interface 120 detects a touch of, for example, an "OK" button from the user, and on the basis of this, the controller 155 stores the scan data, together with the tags, in the NAS 200 with the tentatively determined file name. On the other hand, if the user wishes to edit the tentatively determined file name, the user interface 120 accepts file name input from the user. On the basis of this, the controller 155 stores the scan data, together with the tags, in the NAS 200 with a file name edited by the user.

Figure 4:
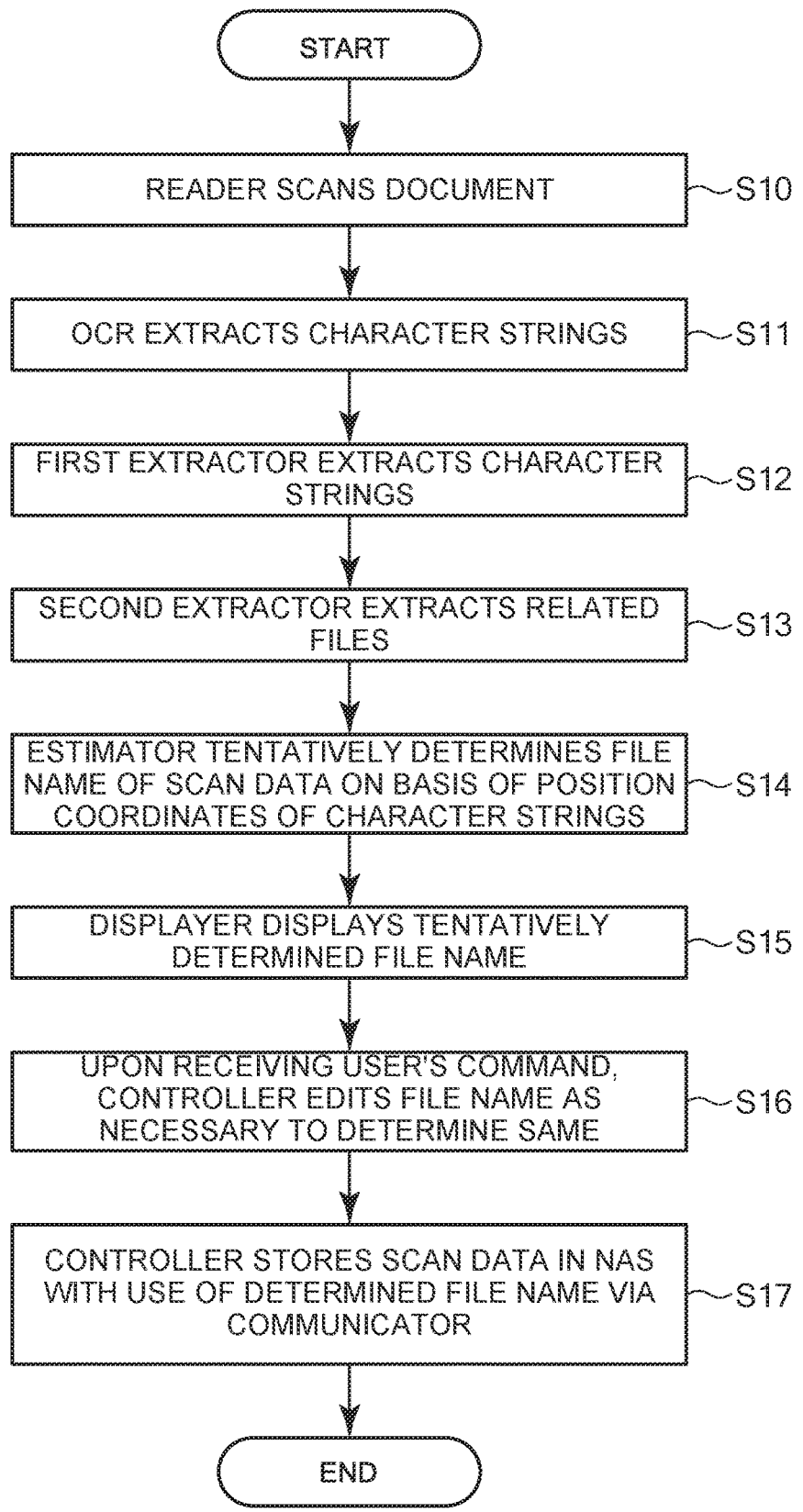
FIG. 4 is a flowchart illustrating an example of a flow of processing according to the first embodiment.

FIG. 4 is a flowchart illustrating the operation of the image forming apparatus 100 according to the first embodiment, particularly the flow of processing related to the method for tentatively determining a file name, which is described with reference to FIGS. 3A and 3B.

As illustrated in the figure, first, in step S10, the reader 110 scans the document and generates scan data. Then, in step S11, the OCR 151 extracts character strings contained in the scanned data.

Next, in step S12, the first extractor 152 extracts the first character information from the character strings extracted by the OCR 151. Furthermore, in step S13, the second extractor 153 extracts related files from the NAS 200. This step corresponds to the extraction of "DAILY BUSINESS REPORT_AYAMA BTARO_20210830.pdf", "DAILY BUSINESS REPORT_AYAMA BTARO_20210829.pdf", and "DAILY BUSINESS REPORT_AYAMA BTARO_20210828.pdf" as related files, in the example described with reference to FIG. 2.

Next, in step S14, the estimator 154 tentatively determines the file name of the scan data on the basis of the relation between the position coordinates of the character strings in the image data of the related file and the file name. Step S14 is as described with reference to FIGS. 3A and 3B. Here, for example, in the example of FIGS. 3A and 3B, the estimator 154 may narrow down the area to be searched in the scan data to the area corresponding to a partial area including the area (position coordinates C1, C2, and C3)

where the character string used for the file name in the related file is included, and may not search the entire area of the scan data. This reduces the search area for the estimator 154 and improves processing speed.

Once the file name of the scan data is tentatively determined, the displayer 130 displays the tentatively determined file name and presents same to the user in step S15. Then, in step S16, the user interface 120 accepts a user command, and the controller 155, for example, edits the file name as necessary to determine the file name. After that, in step S17, the controller 155 stores the scan data together with the tags in the NAS 200 with the use of the determined file name via the communicator 140. In step S15, a folder in which the scan date should be stored may be suggested. In other words, for example, the controller 155 may suggest a folder in which files that have been recognized as a related file in the NAS 200 are stored as a folder in which the scan data should be stored. Alternatively, for example, the controller 155 may estimate the storage destination folder for the scan data with the use of a method similar to the file name estimation method described above, for example. For example, in the example in FIG. 2, the related file is "DAILY BUSINESS REPORT_AYAMA BTARO_DATE.pdf". Further, suppose that the estimated file name for the scan data is "DAILY BUSINESS REPORT_GDA HKO_DATE.pdf". Then, for example, the estimator 154 analyzes the relation between the file name of the related file, and the folder in which the related file is stored and the hierarchical structure of that folder. In this example, the related files are stored in the folder "AYAMA BTARO" in the folder "DAILY BUSINESS REPORT". In other words, in a folder with the same name as the character string X located at the position coordinates C1 described with reference to FIG. 3A ("DAILY BUSINESS REPORT" in this example), the related files are stored in a folder with the same name as the character string Y located at the position coordinates C2 (in this example, "AYAMA BTARO"). Therefore, the estimator 154 suggests to the user a folder to store the scan data on the basis of the same rule. For example, in the scan data "DAILY BUSINESS REPORT_GDA HKO_DATE.pdf", the character string X' "DAILY BUSINESS REPORT" is located at position coordinates C1 and the string Y' "GDA HKO" is located at position coordinates C2. Therefore, if there is a folder named "GDA HKO" in the folder "DAILY BUSINESS REPORT", the estimator 154 suggests same to the user as the storage destination folder for the scan data. If the folder "GDA HKO" does not exist in the folder "DAILY BUSINESS REPORT", the estimator 154, for example, may create a folder "GDA HKO" in the folder "DAILY BUSINESS REPORT". Alternatively, the folder "GDA HKO" may be suggested to the user as a storage destination and the creation of a folder "GDA HKO" may also be suggested to the user. In either case, the folder name may be displayed on the displayer 130 and the storage destination folder may be determined by accepting a user command in the same manner as file names.

According to the image forming system 1 of the above embodiment, the image forming apparatus 100 extracts from the NAS 200 a related file containing a characteristic character string extracted from the scan data of a scanned document. The image forming apparatus 100 then estimates and tentatively determines the file name of the scan data on the basis of the naming rule (order of character strings, etc.) of the extracted related file.

In this way, the image forming apparatus 100 analyzes the related file corresponding to the scan data in the NAS 200 to estimate and tentatively determine the file name of the scan data, thereby enabling the appropriate file name to be set for the scan data easily without preparing a naming rule table in advance. As a result, the user can easily search for a desired file on the basis of the file name.

If no related file is found in step S13, for example, the estimator 154 may tentatively determine a file name according to a predetermined rule and present same to the user. In this case, the controller 155 may present the user with the creation of a new folder in the NAS 200, and for example, the estimator 154 may present the user with the name of that folder in accordance with a predetermined rule.

Second Embodiment

Next, a second embodiment will be described. In the second embodiment, the second extractor 153 uses a tag when extracting a related file, and the NAS 200 prepares a tag table (first table) in the first embodiment above. Only differences from the first embodiment will be described below.

The NAS 200 according to this embodiment is, for example, a server or the like having a processor, and FIG. 5 is a block diagram of the NAS 200 according to this embodiment. As illustrated in the figure, the NAS 200 includes a user interface 210, a displayer 220, a communicator 230, a processor 240, and a storage 250.

The user interface 210 accepts commands from the user for the NAS 200. The user interface 210 may be, for example, a keyboard, mouse, stylus pen, or the like.

The displayer 220 is, for example, a display or the like, capable of displaying, for example, the status of processing in the NAS 200. The displayer 220 may be a touch panel LCD screen, or the like. In this case, the displayer 220 may be integrated with the user interface 210.

The communicator 230 can communicate with the external image forming apparatus 100 wirelessly or by wire. Further, the communicator 230 stores the scan data received from the image forming apparatus 100 together with the tags in the storage 250 with the use of the file name similarly received from the image forming apparatus 100.

The storage 250 is a storage device for data storage, such as a hard disk drive or solid state drive (SSD), and stores various types of data. This data includes the scan data received from the image forming apparatus 100. The storage 250 may also store a tag table, which is described below.

The processor 240 is a processor, such as a CPU. The processor 240 functions as an analyzer 241, a tag table generator 242, and a controller 243 by executing a program stored in a ROM or RAM (not illustrated) in the NAS 200. The program is stored in a non-transitory recording medium, such as a semiconductor medium, an optical recording medium, or a magneto-optical recording medium, including, for example, the above-mentioned ROM and RAM. Further, when the program stored in the recording medium is executed by the processor 240, the processor 240 functions as the analyzer 241, tag table generator 242, and controller 243 to implement various controls in each embodiment. The program described above may also be acquired by the NAS 200 from an external server through a network. As a matter of course, the functions in the processor 240 may be configured by a dedicated circuit (hardware) such as an electronic circuit instead of a processor.

The analyzer 241 analyzes a file held in the storage 250 and generates a tag to be assigned to the file, similarly to the first extractor 152 described in the first embodiment, for example. In other words, the analyzer 241 extracts characteristic character strings (first character information) contained in the image data for files that are not tagged in the image forming apparatus 100. In this case, the analyzer 241 may perform the same function as that of the OCR 151 described in the first embodiment, if necessary. In other words, the analyzer 241 may recognize and extract character strings contained in the image data of the file to be analyzed and extract the first character information therefrom. Furthermore, the analyzer 241 analyzes the position coordinates of the character strings contained in the file name, as described with reference to FIGS. 3A and 3B of the first embodiment. The analyzer 241 then holds, for each file, the character strings contained in the file name of the file held in the storage 250 and the position coordinates in the image data of that file. The position coordinates (e.g., position coordinates C1, C2, and C3 in FIGS. 3A and 3B) obtained by the estimator 154 of the image forming apparatus 100 described in the first embodiment may be stored in the tag table of the storage 250 together with file name information and the like, and such a case is described in this embodiment. The processing by the analyzer 241 may be performed, for example, at night or on holidays when the image forming apparatus 100 is used less frequently, in accordance with a command from the controller 244, for example.

The tag table generator 242 generates a tag table with the use of the tags received from the image forming apparatus 100 and the tags obtained by the analyzer 241. FIG. 6 is a diagram illustrating an example of the tag table.

As illustrated in the figure, the tag table holds, for each file, the file name of the file stored in the storage 250, along with the folder hierarchy information where the file is stored, the position coordinates of the character strings related to the file name, and the tags assigned to the file. In the example in FIG. 6, only two position coordinates, the start coordinates and the end coordinates, are indicated, but this is for simplicity of explanation, and more detailed coordinates information may be held.

Next, the method for tentatively determining a file name by the image forming apparatus 100 will be described. The difference between this embodiment and the first embodiment is that, in step S13 described in the first embodiment, the second extractor 153 extracts related files by using a tag table. In other words, for example, when "DAILY BUSINESS REPORT" is selected as a tag for scan data, the second extractor 153 refers to the tag table and extracts files whose tag is "DAILY BUSINESS REPORT" as related files. In the example in FIG. 6, the following five files are extracted as related files.

DAILY BUSINESS REPORT_AYAMABTARO_20210828.pdf
DAILY BUSINESS REPORT_AYAMABTARO_20210829.pdf
DAILY BUSINESS REPORT_AYAMABTARO_20210830.pdf
DAILY BUSINESS REPORT_CMOTODMI_20210828.pdf
DAILY BUSINESS REPORT_ETANIFSUKE_20210828.pdf After that, as in the first embodiment, the file name of the scan data is tentatively determined on the basis of the character strings contained in these file names and their position information.

In this embodiment, the case where the tag table is generated by the NAS 200 is described as an example, but the tag table may also be formed by the image forming apparatus 100. In that case, for example, the processor 150 can function as the analyzer 241 and the tag table generator 242 by executing a program. Alternatively, and at a predetermined timing, the tag table may be stored in the storage 250 of the NAS 200, or in a non-volatile memory or the like possessed by the image forming apparatus 100.

FIG. 7 is a flowchart illustrating the operation of the image forming system 1 according to the second embodiment, which corresponds to FIG. 4 described in the first embodiment.

As illustrated in the figure, first, in step S20, the NAS 200 analyzes untagged files to determine tags and position coordinates as described above, and the tag table generator 242 stores the determined tags and position coordinates in a tag table along with file names and folder hierarchy information. The processing of step S20 in FIG. 7 can be performed independently of each processing after step S10.

After that, the processing of steps S10 to S12 is performed in the same manner as in the first embodiment. Then, after step S12, in step S21, the second extractor 153 reads the tag table from the NAS 200, for example, and refers to this tag table to thereby extract files with the same tags as related files. The method for referring to the tag table may be, for example, a method in which the second extractor 153 reads the tag table from the NAS 200 to the image forming apparatus 100 via the communicator 140, as described above, or a method in which the second extractor 153 transmits the tags of the scan data to the NAS 200, the processor 240 of the NAS 200 further functions as a searcher, the searcher refers to the tag table and extracts related files from the storage 250, and transmits the related files to the second extractor 153.

Subsequent processing is similar to that of steps S14 to S17 described in the first embodiment. As described above, in this embodiment, in step S17, the NAS 200 may store the position coordinates information related to the file name in addition to the scan data and file name.

According to this embodiment, in the configuration described in the first embodiment, the NAS 200 further analyzes the relation between a held file and a tag at a predetermined timing and manages same as a tag table. Therefore, the second extractor 153 can easily extract related files by referring to the tag table. This simplifies the processing for tentatively determining a file name and improves processing speed.

Third Embodiment

Next, a third embodiment will be described. In the third embodiment, instead of using tags when the second extractor 153 extracts related files, the first extractor 152 refers to a tag table to determine the tags, or first character information, that should be assigned to the scan data, in the second embodiment above. Only differences from the first and second embodiments will be described below.

FIG. 8 is a flowchart illustrating the operation of the image forming system 1 according to the third embodiment, which corresponds to FIG. 4 described in the first embodiment and FIG. 7 described in the second embodiment.

As illustrated in the figure, the processing of step S20 described in the second embodiment is performed, and subsequently the processing of steps S10 and S11 described in the first embodiment is performed.

After step S11, the first extractor 152 reads the tag table from the NAS 200 in step S30 and determines the tags (first character information) to be extracted from the scan data by referring to this tag table. In other words, in the example in FIG. 6, the first extractor 152 considers the character strings registered as tags, such as "DAILY BUSINESS REPORT", "NAME", "DATE", "PERFORMANCE DECLARATION", and "FIRST HALF OF 2021", as candidate tags, and searches these character strings in the scan data image. If there is no matching character string, the tag is extracted by the method described in the first embodiment.

The method for referring to the tag table may be the same as in the second embodiment, for example, the method in which the first extractor 152 reads the tag table from the NAS 200 to the image forming apparatus 100 via the communicator 140, or the method in which the processor 240 of the NAS 200 further functions as a searcher, the searcher refers to the tag table and extracts all (or some) tags contained in the tag table from the storage 250, and transmits same to the first extractor 152.

After that, the processing of steps S13 to S17 is performed in the same manner as in the first embodiment.

According to this embodiment, in the configuration described in the first embodiment, the NAS 200 further holds the relation between a held file and a tag as a tag table. Therefore, the first extractor 152 can easily extract appropriate tags by referring to the tag table. This simplifies the processing for tentatively determining a file name and improves processing speed.

The second and third embodiments can also be implemented in combination. In other words, in the flowchart in FIG. 8, instead of step S13, the processing of step S21 described in the second embodiment may be implemented. This can improve the processing speed of tag selection and related file extraction.

Fourth Embodiment

Next, a fourth embodiment will be described. The fourth embodiment is such that the NAS 200 has a unique character string table (second table) in addition to the tag table, and the first extractor 152 of the image forming apparatus 100 extracts tags on the basis of unique character strings in the third embodiment above. Only differences from the first to third embodiments will be described below.

FIG. 9A is an example of a tag table held by the storage 250 of the NAS 200. In the example in FIG. 9A, the position coordinates information illustrated in FIG. 6 is omitted. As illustrated in the figure, each file is classified into one of Patterns A to C in the tag table according to this embodiment. The analyzer 241 analyzes, for example, the layout of the image data in each file. For example, each file is classified into several patterns on the basis of the position of ruled lines in the image data and the similarity of paper formats. In the example of FIG. 9C, the patterns are divided as follows.

(1) PATTERN A
   DAILY BUSINESS REPORT_AYAMA BTARO_20210828.pdf
   DAILY BUSINESS REPORT_AYAMA BTARO_20210829.pdf
   DAILY BUSINESS REPORT_AYAMA BTARO_20210830.pdf
   DAILY BUSINESS REPORT_CMOTO DMI_20210828.pdf
   DAILY BUSINESS REPORT_ETANI FSUKE_20210828.pdf (2) PATTERN B
   PERFORMANCE DECLARATION_AYAMA BTARO_FIRST HALF OF 2021.pdf
   PERFORMANCE DECLARATION_CMOTO DMI_FIRST HALF OF 2021.pdf
   PERFORMANCE DECLARATION_ETANI FSUKE_FIRST HALF OF 2021.pdf (3) PATTERN C
   BUSINESS TRIP REPORT_AYAMA BTARO_20210827 PATENT OFFICE.pdf
   BUSINESS TRIP REPORT_ETANI FSUKE_20210831 TOKYO PATENT OFFICE.pdf In the above example, files related to daily business reports are classified into Pattern A, files related to performance declaration are classified into Pattern B, and files related to business trip reports are classified into Pattern C. The daily business report, performance declaration, business trip report, and the like generally have a uniform paper format. Thus, the analyzer 241 can pattern each file on the basis of the format of each paper.

The analyzer 241 further extracts unique character strings with the use of the tag table illustrated in FIG. 9A. For example, for each tag in each pattern, the analyzer 241 extracts, as unique character strings, character strings excluding the date, which are commonly included in the same pattern and infrequently included in other patterns. As a matter of course, the method for extracting unique character strings is not limited to this, and there may be multiple character strings extracted per pattern.

FIG. 9B is a table indicating the appearance rate of a tag in each pattern and whether the tag is a date. As illustrated in the figure, the analyzer 241 judges whether the tag is a date, and if the tag is a date, excludes same from the unique character strings. Furthermore, the analyzer 241 calculates the appearance rate of tags in each pattern. As is clear from FIG. 9A, the character string "DAILY BUSINESS REPORT" is extracted as a tag common to all five files belonging to Pattern A. In other words, the appearance rate in Pattern A is 100%. In contrast, in Patterns B and C, there is not a single file in which the character string "DAILY BUSINESS REPORT" is extracted as a tag (0% appearance rate). Therefore, the analyzer 241 extracts the string "DAILY BUSINESS REPORT" as a unique character string for files belonging to Pattern A.

Similarly, the appearance rate of the character string "PERFORMANCE DECLARATION" in Pattern B is 100%, while in Patterns A and C the appearance rate is 0%. Therefore, the analyzer 241 extracts the string "PERFORMANCE DECLARATION" as a unique character string for files belonging to Pattern B. Further, the appearance rate of the character string "BUSINESS TRIP REPORT" in Pattern C is 100%, while in Patterns A and B the appearance rate is 0%. Therefore, the analyzer 241 extracts the string "BUSINESS TRIP REPORT" as a unique character string for files belonging to Pattern C. The example in FIG. 9B illustrates a case where the character string "FIRST HALF OF 2021" is judged to be a date. However, in some cases, the character string "FIRST HALF OF 2021" may not be judged as a date. In this case, the appearance rate of the character string "FIRST HALF OF 2021" in Pattern B is also 100%, while in Patterns A and C the appearance rate is 0%. Thus, in addition to "PERFORMANCE DECLARATION", "FIRST HALF OF 2021" could also be extracted as a unique character string for Pattern B.

Further, for example, the tag table generator 242 generates a unique character string table with the use of the unique character strings extracted by the analyzer 241 and stores same in the storage 250. FIG. 9C is a conceptual diagram illustrating an example of the unique character string table.

As illustrated in the figure, the unique character string table holds the file name for each pattern and the unique character string for each pattern. The unique character string table may also include position coordinates information of the unique character strings.

In this embodiment, when the image forming apparatus 100 tentatively determines the file name of scan data, the first extractor 152 extracts the first character information on the basis of a unique character string in the unique character string table. In other words, the first extractor 152 searches for a unique character string in the image data of the scan data, using the unique character string contained in the unique character string table as a candidate for a tag of the scan data. Then, the found unique character string is extracted as the tag (first character information) of the scan data.

FIG. 10 is a flowchart illustrating how to create the above unique character string table. As described above, first, in step S40, the analyzer 241 classifies the files held in the storage 250 into one of the patterns on the basis of, for example, the layout of the images. Subsequently, in step S41, the analyzer 241 calculates the appearance rate of tags in each pattern, as described with reference to FIG. 9B. In step S42, the analyzer 241 excludes date-related character strings from the unique character strings among the tags. The processing of step S42 may be performed before step S41, in which case the calculation of the appearance rate of date-related character strings may be omitted. Then, in step S43, the analyzer 241 extracts character strings commonly included in the same pattern and infrequently included in other patterns as unique character strings. The criteria for extracting unique character strings in step S43 can be selected as desired. For example, the unique character string does not have to be commonly included in the same pattern, but may be included above a certain threshold, such as 90% or more. The frequency of inclusion in other patterns is also not limited to 0%, but may be below a certain threshold. After that, as described with reference to FIG. 9C, the tag table generator 242 creates a table of pattern information and file name information along with the unique character strings extracted in step S43 to complete the unique character string table.

In this embodiment, the case where the tag table and unique character string table are generated by the NAS 200 is described as an example, but the tag table may also be formed by the image forming apparatus 100. In that case, for example, the processor 150 can function as the analyzer 241 and the tag table generator 242 by executing a program. Further, the tag table and unique character string table are stored in the NAS 200, but may also be held in a non-volatile memory or other storage in the image forming apparatus 100.

Figure 11:
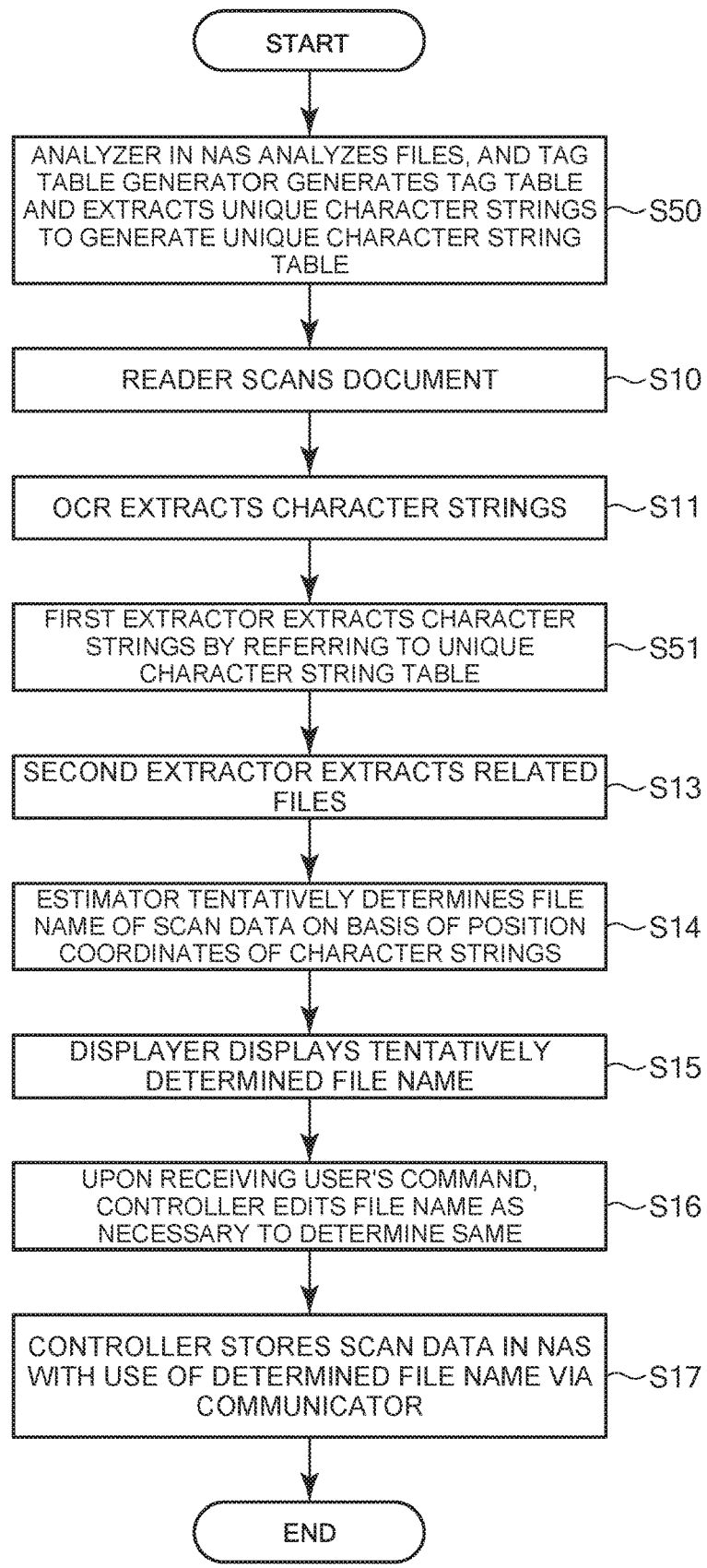
FIG. 11 is a flowchart illustrating an example of a flow of processing according to the fourth embodiment.

FIG. 11 is a flowchart illustrating the operation of the image forming system 1 according to this embodiment, which corresponds to FIG. 4 described in the first embodiment, FIG. 7 described in the second embodiment, and FIG. 8 described in the third embodiment.

As illustrated in the figure, in step S50, a tag table is generated by the processing of step S20 described in the second embodiment, and the tag table generator 242 further generates a unique character string table by the method described above with the use of tables in FIGS. 9A, 9B, and 9C. The details of step S50 are as described with reference to FIG. 10, and as is the case with the tag table, step S50 is also performed, for example, at night when the image forming apparatus 100 is used less frequently.

Next, the processing of steps S10 and S11 described in the first embodiment is performed. After step S11, the first extractor 152 reads the unique character string table from the NAS 200 in step S51 and determines the tags (first character information) to be extracted from the scan data by referring to this unique character string table. In other words, in the example in FIG. 9C, the first extractor 152 considers the strings registered as unique character strings, such as "DAILY BUSINESS REPORT", "PERFORMANCE DECLARATION", and "BUSINESS TRIP REPORT", as candidate tags, and searches these character strings in the scan data image. If there is no matching character string, the tag is extracted by the method described in the first embodiment.

The method for referring to the unique character string table may be the same as in the second and third embodiments, for example, the method in which the first extractor 152 reads the tag table from the NAS 200 to the image forming apparatus 100 via the communicator 140, or the method in which the processor 240 of the NAS 200 further functions as a searcher, the searcher refers to the unique character string table and extracts all (or some) unique character strings contained in the unique character string table from the storage 250, and transmits same to the first extractor 152.

After that, the processing of steps S13 to S17 is performed in the same manner as in the first embodiment.

According to this embodiment, in the configuration described in the first embodiment, the NAS 200 further holds the relation between a held file and a unique character string that is a character string characteristic of the file as a unique character string table. Therefore, the first extractor 152 can easily extract appropriate tags by referring to the unique character string table. This simplifies the processing for tentatively determining a file name and improves processing speed.

In the above embodiment, the case where the first extractor 152 refers to the unique character string table is described as an example. However, instead of step S51, the second extractor 153 may refer to the unique character string table in step S13. In other words, the first character information (tag) extracted by the first extractor 152 may be searched for in the unique character string table, and files for which the first character information and a unique character string match may be extracted as related files.

The unique character string table may be referred in both steps S51 and S13. In this case, in step S51, the first extractor 152 extracts the first character information on the basis of the unique character string table. Then, in step S13, the second extractor 153 may search the unique character string table for files corresponding to the unique character string that matches the extracted first character information, and extract the found files as related files. For example, in the example of FIG. 9C, in a case where "DAILY BUSINESS REPORT" is extracted as the first character information, the second extractor 153 may extract, as related files, the five files of Pattern A to which "DAILY BUSINESS REPORT" is assigned as the unique character string in the unique character string table.

As described above, the unique string table may be used in at least one of steps S51 and S13, or if the unique character string table is used in either processing, the tag table should be used in the other processing.

Modification

As described above, according to the image forming apparatus, image forming system, and image forming program of the first through fourth embodiments, the file name of scan data can be easily set. The embodiments are not limited to those described above, and various modifications are possible. Each embodiment may be implemented independently, or multiple embodiments may be implemented in combination.

In the above embodiment, an example of a copier is given as the image forming apparatus 100, but the image forming apparatus 100 is not limited to copiers and can be widely applied to devices that capture image data from the outside and store same as electronic data. Further, the storage device 200 is not limited to a NAS, and may be external to the image forming apparatus 100, such as a universal serial bus (USB) memory connected to the copier. Alternatively, the storage device can be applied to a case where scan data is stored in the copier's internal storage device. Furthermore, in the above embodiment, the case is described as an example, in which the scan data and files stored in the NAS 200 are documents related to business, and the tag table and unique character string table are stored for each type of business operations, but needless to say, the embodiment is not limited to this.

The present disclosure is not limited to each of the above-described embodiments, and various modifications may be made thereto within the scope indicated by the claims. An embodiment that can be implemented by appropriately combining techniques disclosed in the different embodiments also falls within the technical scope of the present disclosure. Moreover, new technical features can be created by combining the techniques disclosed in each of the embodiments. Further, the order of the processing in the flowcharts described in the embodiments described above can be interchanged as much as possible.

The programs that implement the functions of each of the embodiments are stored in a non-transitory recording medium, such as a semiconductor medium, an optical recording medium, and a magneto-optical recording medium. For example, a non-volatile memory card or the like may be used as the semiconductor medium. A compact disc (CD) or a digital versatile disc (DVD) may be used as the optical recording medium and the magneto-optical recording medium. Furthermore, the above programs may be supplied to a computer via any transmission medium capable of performing transmission.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:
   a reader that reads a document and generates first document data;
   a first extractor that extracts first character information included in the first document data;
   a second extractor that searches a storage device storing a plurality of pieces of document data and extracts, from the plurality of pieces of document data, one or more pieces of second document data including second character information related to the first character information; and
   an estimator that determines a file name to be set for the first document data from the first character information based on a naming rule for a file name of the one or more pieces of second document data and a relation between the second character information and the file name of the one or more pieces of second document data.

2. The image forming apparatus according to claim 1, wherein the estimator further determines that the first character information described at a position in the first document data corresponding to a position, in the one or more pieces of second document data, of the second character information that matches character information included in the file name of the one or more pieces of second document data is a file name to be set for the first document data.

3. The image forming apparatus according to claim 1, wherein the estimator further determines a folder to which the one or more pieces of second document data belong, as a storage destination of the first document data.

4. The image forming apparatus according to claim 3, further comprising a displayer,
   wherein the displayer displays the determined file name of the first document data and a name of the folder that serves as the determined storage destination folder in an editable format.

5. The image forming apparatus according to claim 1,
   wherein the estimator further determines, from the first character information, a name of a folder serving as a storage destination of the first document data and a hierarchy in which the folder having the name is located based on a hierarchical structure of a storage destination folder of the one or more pieces of second document data and a naming rule for a folder name of the storage destination folder, the naming rule for the folder name being based on the relation between the second character information and the file name of the one or more pieces of second document data, and
   the estimator generates a new folder with the name in the determined hierarchy when the new folder with the name does not exist in the determined hierarchy.

6. The image forming apparatus according to claim 1, wherein the storage device further stores a first table that manages the first character information corresponding to the plurality of pieces of document data as tags together with position information of the first character information within the plurality of pieces of document data.

7. The image forming apparatus according to claim 6, wherein the second extractor refers to the first table and extracts the one or more pieces of second document data based on the relation between the second character information held in the first table and the first character information.

8. The image forming apparatus according to claim 6, wherein the first extractor refers to the first table and extracts the first character information in the first document data based on the second character information held in the first table.

9. The image forming apparatus according to claim 6,
   wherein the storage device further stores a second table that manages unique character string information, based on an appearance rate of the tags, for the one or more pieces of second document data stored in the storage device, and
   the first extractor extracts the first character information based on the unique character string information.

10. The image forming apparatus according to claim 9, wherein if the tags include a character string indicating a date, the tags are excluded from the unique character string information.

11. The image forming apparatus according to claim 9,
   wherein the first document data and the one or more pieces of second document data are associated with documents related to business operations, and
   the second table stores a corresponding file name and a tag for each type of the business operations.

12. An image forming system comprising:
a storage device storing a plurality of pieces of document data; and
an image forming apparatus, comprising:
- a reader that reads a document and generates first document data;
- a first extractor that extracts first character information included in the first document data;
- a second extractor that searches the storage device and extracts, from the plurality of pieces of document data, one or more pieces of second document data including second character information related to the first character information; and
- an estimator that determines a file name to be set for the first document data from the first character information based on a naming rule for a file name of the one or more pieces of second document data and a relation between the second character information and the file name of the one or more pieces of second document data.

13. A method performed by an image forming apparatus, the method comprising:

reading a document and generating first document data;

extracting first character information included in the first document data;

searching a storage device storing a plurality of pieces of document data and extracting, from the plurality of pieces of document data, one or more pieces of second document data including second character information related to the first character information; and determining a file name to be set for the first document data from the first character information based on a naming rule for a file name of the one or more pieces of second document data and a relation between the second character information and the file name of the one or more pieces of second document data.

* * * * *